(12) United States Patent
Juhasz et al.

(10) Patent No.: US 8,587,316 B2
(45) Date of Patent: Nov. 19, 2013

(54) NOISE REDUCTION SYSTEMS AND METHODS FOR A GEOPHYSICAL SURVEY CABLE

(75) Inventors: Robert Juhasz, Stockholm (SE); Mattias Südow, Solna (SE); Joel Skogman, Järfälla (SE); Panagiotis Verras, Newbridge (GB); Peter Lindqvist, Segeltorp (SE)

(73) Assignee: PGS Geophysical AS, Oslo (NO)

( * ) Notice: Subject to any disclaimer, the term of this patent is extended or adjusted under 35 U.S.C. 154(b) by 173 days.

(21) Appl. No.: 13/315,020

(22) Filed: Dec. 8, 2011

(65) Prior Publication Data

US 2013/0148468 A1   Jun. 13, 2013

(51) Int. Cl.
  *G01V 3/00* (2006.01)
  *G01V 3/12* (2006.01)
  *G01V 3/08* (2006.01)

(52) U.S. Cl.
  USPC .................. 324/365; 367/15; 367/20

(58) Field of Classification Search
  USPC ............... 367/20; 324/365, 347, 357
  See application file for complete search history.

(56) References Cited

U.S. PATENT DOCUMENTS

| | | |
|---|---|---|
| 2,293,024 A | 8/1942 | Klipsch |
| 2,531,088 A | 11/1950 | Thompson |
| 2,839,721 A | 6/1958 | De Witte |
| 2,872,638 A | 2/1959 | Jones |
| 3,052,836 A | 9/1962 | Postma |
| 3,113,265 A | 12/1963 | Woods et al. |
| 3,182,250 A | 5/1965 | Mayes |
| 3,329,929 A | 7/1967 | Burnett |
| 3,514,693 A | 5/1970 | Cagniard |
| 3,525,037 A | 8/1970 | Madden et al. |
| 3,967,190 A | 6/1976 | Zonge |
| 4,041,372 A | 8/1977 | Miller et al. |
| 4,047,098 A | 9/1977 | Duroux |
| 4,070,612 A | 1/1978 | McNeill et al. |
| 4,298,840 A | 11/1981 | Bischoff et al. |
| 4,617,518 A | 10/1986 | Srnka |

(Continued)

FOREIGN PATENT DOCUMENTS

| | | |
|---|---|---|
| GB | 2479623 A | 10/2011 |
| WO | WO-02/14906 | 2/2002 |
| WO | 2008023174 A2 | 2/2008 |
| WO | 2010007344 A1 | 1/2010 |

OTHER PUBLICATIONS

Burrows, Michael J., "Motion-Induced Noice in Electrode-Pair Extremely Low Frequency (ELF) Receiving Antennas", *IEEE Transactions on Communications*, (Apr. 1972), pp. 540-542, vol. COM-22, No. 4.

(Continued)

*Primary Examiner* — Isam Alsomiri
*Assistant Examiner* — Hovhannes Baghdasaryan

(57) ABSTRACT

A disclosed geophysical survey cable includes a signal amplifier coupled between two electrodes spaced apart along the length of the geophysical survey cable (the electrodes being coupled to the signal amplifier by a first conductor pair), and a noise amplifier coupled to a second conductor pair positioned substantially parallel to the first conductor pair. The geophysical survey cable further includes a combiner that combines a noise signal provided by the noise amplifier with a sensor signal provided by the signal amplifier to provide a sensor signal with a reduced noise component.

20 Claims, 4 Drawing Sheets

(56) References Cited

U.S. PATENT DOCUMENTS

| | | |
|---|---|---|
| 7,023,213 B2 | 4/2006 | Nichols |
| 7,126,338 B2 | 10/2006 | MacGregor et al. |
| 7,132,831 B2 * | 11/2006 | Brabers .................. 324/365 |
| 7,191,063 B2 | 3/2007 | Tompkins |
| 7,446,535 B1 | 11/2008 | Tenghamn et al. |
| 7,602,191 B2 | 10/2009 | Davidsson |
| 7,671,598 B2 | 3/2010 | Ronaess et al. |
| 7,737,698 B2 | 6/2010 | Tenghamn et al. |
| 7,834,632 B2 | 11/2010 | Tenghamn et al. |
| 8,035,393 B2 | 10/2011 | Tenghamn et al. |
| 8,198,899 B2 * | 6/2012 | Lindqvist ............... 324/365 |
| 2007/0063912 A1 | 3/2007 | Cortambert |
| 2009/0001987 A1 * | 1/2009 | Davidsson ............... 324/347 |
| 2010/0017133 A1 * | 1/2010 | Ziolkowski et al. ............ 702/7 |
| 2010/0045296 A1 | 2/2010 | Tenghamn |
| 2010/0109671 A1 | 5/2010 | Hobbs |
| 2011/0255368 A1 | 10/2011 | Südow et al. |
| 2011/0260730 A1 | 10/2011 | Südow et al. |
| 2011/0273179 A1 | 11/2011 | Südow |

OTHER PUBLICATIONS

Constable, Steven, et al., "An Introduction to Marine Controlled-Source Electromagnetic Methods for Hydrocarbon Exploration", *Geophysics*, (Mar.-Apr. 2007), pp. WA3-WA12, vol. 72, No. 2.

Cirrus Logic, "CRD5376—Multichannel Seismic Reference Design", (Nov. 2007). (Online) (Retrieved on Aug. 26, 2010), Retrieved from the Internet URL http://www.cirrus.com/en/pubs/rdDatasheet/CRD5376_RD2.pdf, 68 pgs.

Cirrus Logic, "CS3301A/02A—Low Noise & Low Power. New Seismic Amplifiers Deliver Outstanding Price/Performance Combination", (2007), (Online) (Retrieved on Aug. 26, 2010), Retrieved from the Internet URL http://www.cirrus.com/en/pubs/proBulletin/CS3301A-02A_PB_0807.pdf, 1 pg.

Constable, Steven et al., "Mapping Thin Resistors and Hydrocarbons with Marine EM Methods: Insights from 1D Modeling", *Geophysic*, vol. 71, No. 2, (Mar.-Apr. 2006), pp. G43-G51.

Newman, Gregory A., et al., "Imaging CSEM Data in the Presence of Electrical Anisotropy", *Geophysical*, vol. 75, No. 2, (Mar.-Apr. 2010), pp. F51-F61

United Kingdom Search Report for Application No. GB1222053.9, dated Mar. 8, 2013.

* cited by examiner

NOISE REDUCTION SYSTEMS AND METHODS FOR A GEOPHYSICAL SURVEY CABLE

BACKGROUND

Geophysical surveys are used in exploration projects that require geological information. Such surveys provide data that can provide information about the structure and distribution of rock types and their contents. This information greatly aids searches for water, geothermal reservoirs, and mineral deposits such as hydrocarbons and ores. Most oil companies rely on geophysical surveys to select sites in which to drill exploratory oil wells.

One form of geophysical surveying, electromagnetic (EM) surveying, generates low frequency EM signals that interact with the strata of interest. Such signals may be transmitted from an emitter cable towed behind a ship or other surface or subsurface marine vessel travelling across a body of water such as a lake or ocean. The generated EM signals propagate through the water and the strata underneath the body of water. As the EM signals interact with the water and strata, the combined resistivity of the water and strata (and to a lesser extent the air above the water) causes the EM signals to decay as they propagate away from the emitter. The resulting electric field present in the water is governed by a combination of the resistive properties of the water, the sub-bottom strata and the air. Differences in the resistivity of the strata along the survey line will translate into minute differences in this electric field. Sensors within a geophysical survey cable (which may also be towed by the ship) detect and measure these minute differences of the electrical fields in the water produced by the EM signals, and these EM field measurements may be used to identify resistivity contrasts that may be indicative of bodies of interest within the strata (e.g., oil and gas reservoirs).

Because of the small magnitude of the measured EM fields, other sources of EM signals can interfere with their detection and measurement. Such sources of interference include the Earth's magnetic field, as well as electromagnetic fields produced by electrical currents within underwater structures such as pipelines and subsea cables. The movement of the towed geophysical survey cable through such magnetic fields can induce electrical noise into the cable's conductors, as can time-variant electromagnetic fields originating from the aforementioned underwater structures. This superimposed electrical noise can be of a magnitude comparable to that of the detected electrical current, making it difficult to discriminate from the noise. Some existing techniques calculate and subtract out some of this noise based upon measurement of the survey cable's movement within the Earth's magnetic fields (see, e.g., U.S. Pat. No. 7,671,598 by Ronaess, et al., hereby incorporated herein by reference). Such solutions, however, require a large number of additional sensors along the length of the cable (e.g., magnetometers and accelerometers). Moreover, these solutions also do not account for artificial underwater electromagnetic sources.

BRIEF DESCRIPTION OF THE DRAWINGS

A better understanding of the various disclosed embodiments can be obtained when the following detailed description is considered in conjunction with the attached drawings, in which.

It should be understood that the drawings and corresponding detailed description do not limit the disclosure, but on the contrary, they provide the foundation for understanding all modifications, equivalents, and alternatives falling within the scope of the appended claims.

DETAILED DESCRIPTION

Accordingly there are disclosed herein various geophysical survey noise reduction systems and methods for use with a geophysical survey cable. In at least some illustrative embodiments, a signal amplifier is coupled between two electrodes that are spaced apart long the length of the geophysical survey cable. A first pair of conductors couples the electrodes to the signal amplifier. A second pair of conductors is positioned parallel to the first pair of conductors is not coupled to any external electrodes, but rather serves only to pick up electromagnetic noise. A noise amplifier is coupled to the second pair of conductors to provide a noise signal. A combiner subtracts a noise signal provided by the noise amplifier from a sensor signal provided by the signal amplifier. The resulting signal output by the combiner includes a reduced noise component as compared to that present in the sensor signal.

The paragraphs that follow describe such illustrative systems and methods in more detail. An overview of an illustrative usage context is first presented to show the basic components of a geophysical survey system and their operation. A more detailed description of some of the components of the illustrative embodiment follows, with example data shown and described to illustrate the disclosed noise reduction systems. An illustrative noise reduction method is also described. Finally, example uses of the resulting reduced noise signal are described within the context of geophysical surveys.

Figure 1:
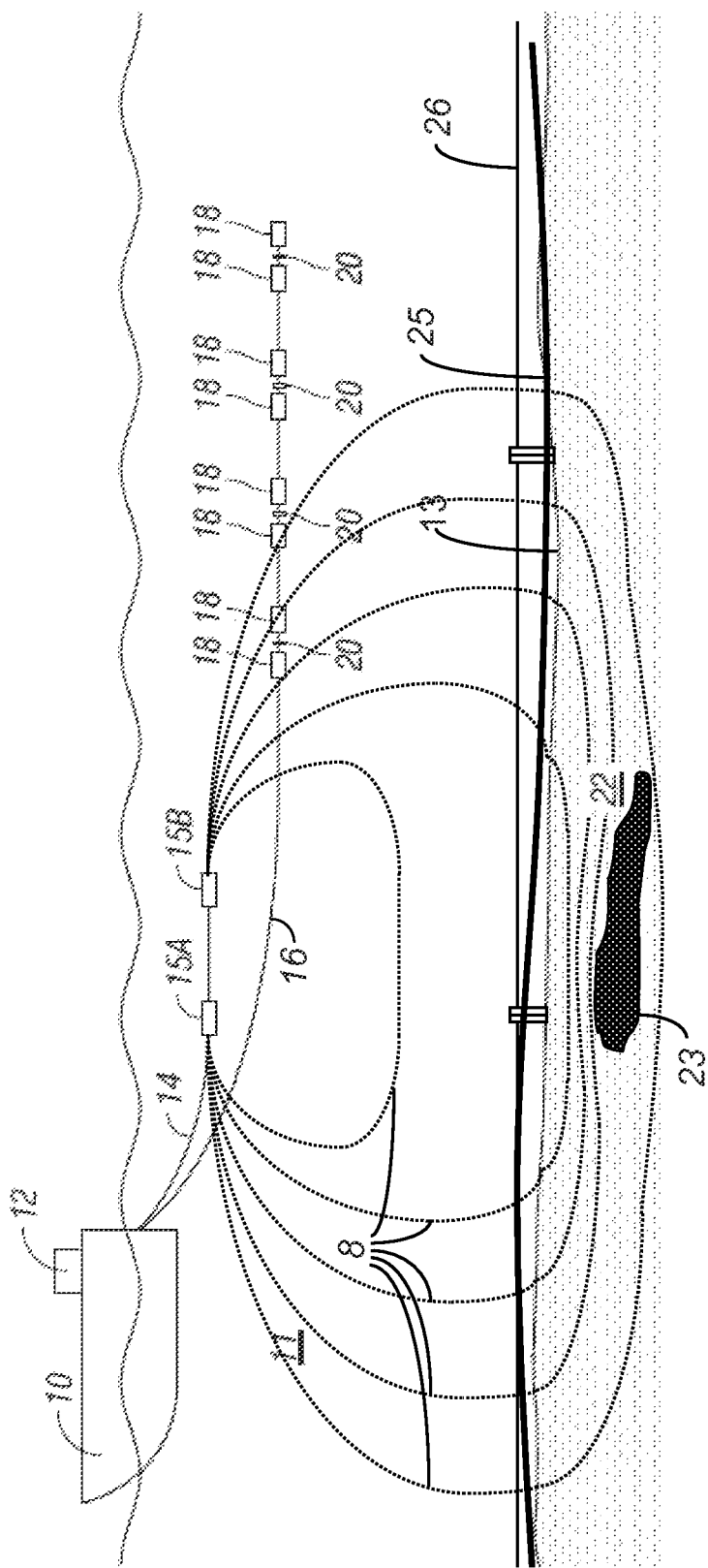
FIG. 1 shows an illustrative marine geophysical survey system.

FIG. 1 shows an overview of an illustrative geophysical survey system operating in a marine environment. A marine vessel 10 travels through a body of water 11 and carries a geophysical recording system 12. One or more geophysical source cables 14 and one or more geophysical survey cables 16 are towed through body of water 11. (Though vessel 10 is shown towing both source and survey cables, other systems may employ multiple vessels with one towing the geophysical survey cables and others towing geophysical sources.) Geophysical source cable 14 includes transmitting electrodes 15A and 15B, which cooperate to produce a low frequency electromagnetic (EM) signal 8 that propagates through body of water 11 and past bottom 13 into strata 22 and body 23. As EM signal 8 propagates, the varying resistivities of water 11, strata 22 and body 23 each produces variations in the field strength of EM signal 8, as illustrated in the example of FIG. 1. The strength of EM signal 8 in the vicinity of geophysical survey cable 16 thus reflects the cumulative resistivity of water 11, strata 22 and body 23. Variations in the field strength of EM signal 8 different from those expected to be caused by strata 22 are thus produced by body 23, which may allow body 23 to be detected, characterized and mapped.

One or more electrode pairs 18 are spaced along geophysical survey cable 16 to detect and measure the electric field potential of EM signal 8 in the vicinity of each electrode pair 18. A sensor module 20 is coupled between the electrodes of each pair 18 to convert the electric field potential into a detection signal. The sensor modules 20 may amplify and transmit the detected signals to recording system 12, for example, via a communications backbone in the geophysical survey cable. In some embodiments, the sensor modules 20 may digitize the detected signals before communicating them to the recording system 12. The recording system 12 may store the data for later processing, though some embodiments provide real-time processing of the data as it is acquired. Such real-time processing may enable the crew to adjust survey parameters as needed to ensure the quality of the acquired survey data.

FIG. 1 also shows examples of several underwater objects on bottom 13, including a subsea cable 25 and an underwater pipeline 26. The electrical currents flowing through subsea cable 25 may include alternating currents. Similarly, underwater pipeline 26 may carry electrical currents from internal heating or anti-corrosion systems or, in some cases, electrical currents induced by external energy sources. Alternating currents generate time-variant EM fields, and the conductors in geophysical survey cable 16 may serve as antennas to such EM fields or, by motion through the magnetic fields created by these currents or even the Earth's magnetic field, incur additional noise that interferes with the detection signals. The conductors in geophysical survey cable 16 may also act as antennas that may pick up additional noise caused by electrical signals produced by the geophysical survey system itself (e.g., by power and communication signals present in geophysical survey cable 16), as well as by electrical devices and equipment onboard marine vessel 10 (e.g., the vessels engines, generators, radios and/or other electrical/electronic equipment).

Figure 2:
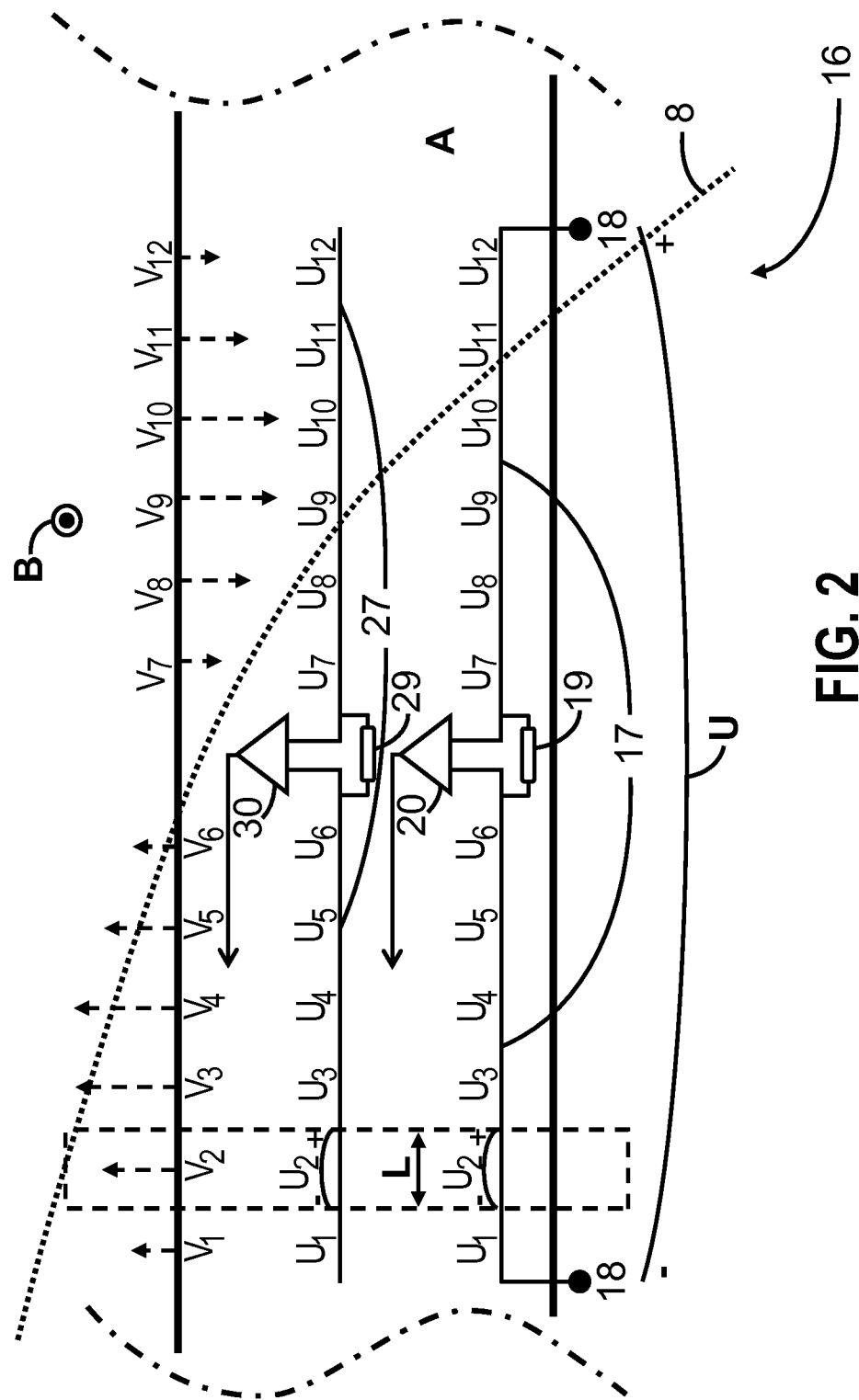
FIG. 2 shows a detailed view of a section of an illustrative geophysical survey cable.

FIG. 2 shows a more detailed view of a section of illustrative geophysical survey cable 16. Though the geophysical survey cable typically includes many conductors, two conductor pairs (17 and 27) are shown here. A signal amplifier 20 is coupled to a pair of electrodes 18 by a first conductor pair 17. A noise amplifier 30 is coupled between a second conductor pair 27 that lies parallel to the first conductor pair 17, but remains unconnected to any external electrodes. Each conductor in the conductor pairs may extend generally parallel to the axis of the survey cable 16; the two conductors in a given pair being longitudinally displaced along the axis from each other. The inputs of signal amplifier 20 may be bridged by a resistor 19 that converts any current flow along the conductors into a voltage signal. A similar resistor 29 may bridge the inputs of noise amplifier 30. In at least some illustrative embodiments, the value for resistors 19 and 29 may be between 1K Ohm and 1M Ohm.

Continuing to refer to the illustrative example of FIG. 2, the electric field of EM signal 8 in the neighborhood of the electrodes 18 produces an electric potential across electrodes 18 that causes an electric current to flow through the first conductor pair 17 and causes an input signal of potential U to develop across resistor 19. Resistor 19 acts as a shunt resistor with a known impedance, enabling the determination of the electric field strength from the input signal voltage across the resistor. The input signal is amplified by signal amplifier 20, which outputs a sensor signal. As previously mentioned, the sensor signal may be subject to interference. One illustrative source of interference is caused by the cable's lateral motions within a magnetic field. Such motion may result from the cable's response to turbulence and water currents and motion of marine vessel 10. In the illustrative embodiment of FIG. 2, geophysical survey cable 16 is shown having lateral motion in a static magnetic field B (shown with field lines that are perpendicular to both the towing direction and the cable's lateral movement). The motion of the cable is represented by local velocity vectors $v_x$, with the corresponding local electric potential vectors $u_x$ shown along each portion of the conductors. For a given local magnetic field vector $B_x$ and local velocity vector $v_x$, the local potential $u_x$ along a conductor segment dl is given by the equation:

$$u_X = v_X B_X dl \qquad (1).$$

The overall potential along the conductor induced by the conductor's movement through the magnetic field is determined by integrating the local cross products over the length of the conductor pair, which is represented as:

$$U_N = \int v_X \times B_X dl \qquad (2).$$

The lateral motion of cable 16 through magnetic field B thus produces an input noise signal on both conductor pair 17 and conductor pair 27. Because both conductor pairs are proximate to each other and pass through the same magnetic field B, the local velocities and local potentials are similar. As a result, the overall noise potential $U_N$ on each conductor pair will also be similar.

Continuing to refer to FIG. 2, the input noise signal induced onto conductor pair 17 is superimposed upon the input sensor signal. As a result, the sensor signal that appears on the output node of signal amplifier 20 has both an input signal component and an input noise component. Because the second conductor pair 27 is configured similarly, but without being coupled to the electrodes, the output of noise amplifier 30 has only the noise component. This noise component can be measured from the output of noise amplifier 30 and subtracted from the output of signal amplifier 20 to obtain a sensor signal with a reduced noise content.

In some embodiments, the noise reduction is carried out before the digitization and storage of the sensor signal. For example, a combiner (e.g., a differential amplifier) may receive the sensor signal from signal amplifier 20 on one input node and the noise signal from noise amplifier 30 on the other input node, the resulting output being a sensor signal with a reduced noise component. In other embodiments, both signals are digitized and stored for later processing, enabling a computer to perform more sophisticated processing when combining the noise signal with the sensor signal to obtain a sensor signal with reduced noise content. Such processing can be implemented by software running on the computer, and it may enable the system to compensate for variations in the characteristics of the amplifiers and conductors when subtracting the noise signal from the sensor signal.

The motion of the conductor pairs 17, 27 through a magnetic field produces just one noise component. Other noise components may also result from other time-variant EM fields independent of the conductors' motion. Such fields may be produced, for example, by electrical currents flowing through subsea electrical cables (e.g., cable 25 of FIG. 1), electrical currents flowing through heaters used to warm underwater pipelines or in active corrosion protection systems for such pipelines (e.g., pipeline 26 of FIG. 1), or other external EM fields. Such electrical noise is sometimes referred to as "cultural noise". Cultural noise may also include electrical noise generated by the geophysical survey system itself (e.g., by power and communication signals present in geophysical survey cable 16), as well as electrical noise produced onboard vessel 10 (e.g., by the engines, generators, radios and/or other electrical equipment). When geophysical survey cable 16 is exposed to such time-variant EM fields, the conductors may act as antennas, picking up signals that would otherwise not be part of the measurements by the electrodes 18. Because conductors 17, 27 are substantially collocated and similarly configured, they will each produce similar cultural noise signals. As before, the noise signal from noise amplifier 30 can be used to reduce the noise content of the sensor signal from signal amplifier 20.

Figure 3:
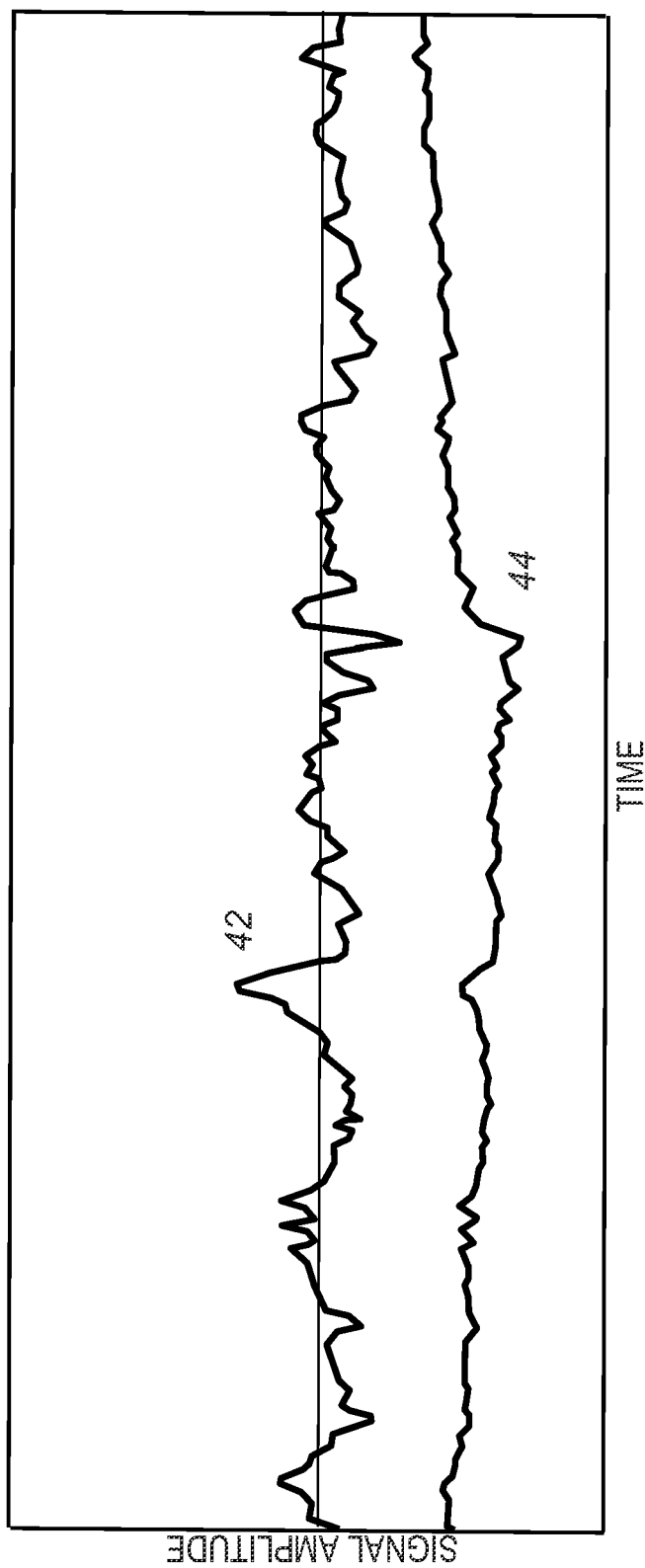
FIG. 3 shows an illustrative set of recorded signals.

FIG. 3 shows illustrative signals acquired in an experimental survey run. Curve 42 shows an illustrative noise signal as a function of time, while curve 44 shows an acquired sensor signal as a function of time. The experimental survey run employed pairs of 200 m long conductors, with resistors 19 and 29 each having values of 1 kilo-ohm. The signals have not been calibrated, but other than a scale factor, the noise signal 42 closely tracks many of the small features evident in the sensor signal 44. The noise signal may thus be used as a basis for reducing the noise component of the acquired sensor signal as previously described.

Figure 4:
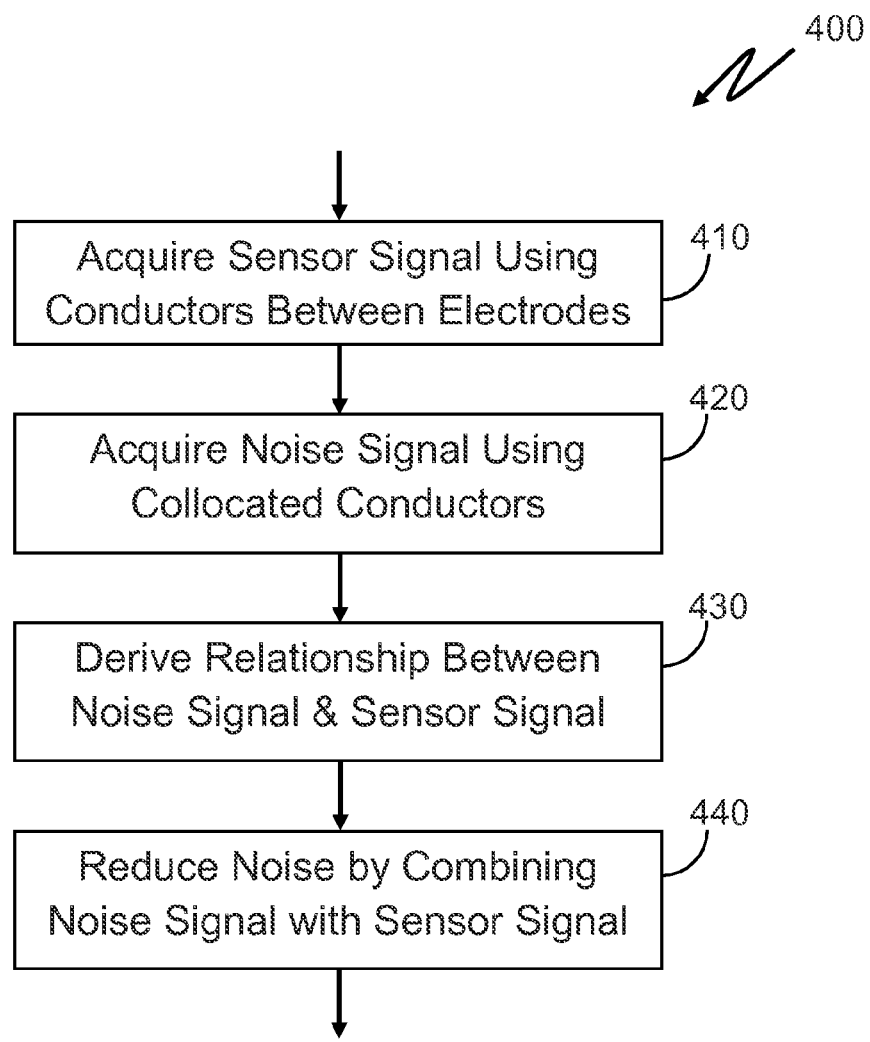
FIG. 4 shows an illustrative method for performing at least part of a marine geophysical survey.

FIG. 4 is a flowchart of an illustrative method 400 for reducing noise in a geophysical survey cable. As noted in more detail below, the previously described illustrative embodiments are examples of systems that implement method 400. In block 410, the system acquires a sensor signal using a pair of conductors coupled between sensor electrodes. In block 420, the system acquires a noise signal with a second pair of conductors substantially collocated with the first pair of conductors. The second pair of conductors is unterminated, yet it acquires a noise signal based on the motion of the cable through a magnetic field and based on its sensitivity to time-dependent EM fields. In block 430, the system derives a relationship between the noise signal and the sensor signal, e.g., by using an adaptive filter that operates on the noise signal to predict the sensor signal. Alternatively a calibration factor may be empirically determined when the survey cable is manufactured and used to scale and subtract the noise signal from the sensor signal. Other real-time or post-processing statistical analysis techniques are known and can be used. The derived relationship can then be used in block 440 to combine the noise signal with the sensor signal in a manner that reduces the noise content in the sensor signal. The differential amplifier and software implementations previously described are examples of illustrative embodiments that perform the described combining The foregoing disclosures can be applied to each pair of electrodes in the array of geophysical survey cables to obtain survey signals with enhanced signal-to-noise ratios. The improved survey signals can be employed in the typical manner to produce subsurface images that describe the geophysical characteristics of the strata below the surface of a body of water. The survey signals represent the electric potential fields induced by EM transmitted signal 8 of FIG. 1. The characteristics and variations of the sensor signal (e.g., magnitude, phase, propagation delay, distortion, etc.) reflect the properties and physical locations of bodies within the strata, as well as the types of soil and rock present within and outside a detected body. For example, by analyzing the variations in the generated field, the resistivity and location of contrasting bodies, and thus the composition of said formations, can be determined. In this manner 2D and 3D geophysical maps of the subsea strata can be generated based upon the sensor signal data produced by the described illustrative embodiments. For a more detailed description of how geophysical survey data is used to produce survey images, see, e.g., Constable, et. al., *An Introduction to Marine Controlled-Source Electromagnetic Methods for Hydrocarbon Exploration* (Geophysics, Vol. 72, No. 2, pp. WA3-WA12, March-April 2007).

Numerous other modifications, equivalents, and alternatives, will become apparent to those skilled in the art once the above disclosure is fully appreciated. For example, the illustrative system embodiments described collect EM survey measurements, but the disclosed technique can be applied to reduce noise in any signal conductor in a geophysical survey cable, regardless of the sensor type. Also, although the described embodiments are shown being towed by a surface marine vessel, the use of the described systems and methods are not limited to towed survey cables, or even to marine environments. Rather, the described methods can also be applied to surface or ocean-bottom survey cables to reduce noise content in the measured signals. It is intended that the following claims be interpreted to embrace all such modifications, equivalents, and alternatives where applicable.

What is claimed is:

1. A geophysical survey cable that comprises:
   two electrodes spaced apart on the geophysical survey cable;
   a first conductor pair coupled to the two electrodes;
   a signal amplifier coupled between the first conductor pair and configured to produce a sensor signal;
   a second conductor pair positioned substantially parallel to the first conductor pair yet unterminated by electrodes; and
   a noise amplifier coupled to the second conductor pair, the noise amplifier being configured to produce a noise signal representing a noise component of the sensor signal.

2. The geophysical survey cable of claim 1, further comprising a combiner that combines the noise signal with the sensor signal to reduce noise in the sensor signal.

3. The geophysical survey cable of claim 2, wherein the combiner is spatially located between the two electrodes.

4. The geophysical survey cable of claim 1, wherein the geophysical survey cable is configured as a towable marine geophysical survey cable.

5. The geophysical survey cable of claim 4, further comprising a combiner that combines a digitized form of the noise signal with a digitized form of the sensor signal to reduce noise in the sensor signal.

6. The geophysical survey cable of claim 1, wherein one conductor of the first conductor pair is coupled to a first input node of the signal amplifier, and the other conductor of the first conductor pair is coupled to a second input node of the signal amplifier; and wherein the cable further comprises a resistor that couples the first and second input nodes of the signal amplifier to each other.

7. The geophysical survey cable of claim 6, wherein one conductor of the second conductor pair is coupled to a first input node of the noise amplifier, and the other conductor of the second conductor pair is coupled to a second input node of the noise amplifier; and wherein the cable further comprises a second resistor that couples the first and second input nodes of the noise amplifier to each other.

8. A geophysical survey system that comprises:
   a survey cable that includes:
      two electrodes spaced apart on the survey cable;
      a first conductor pair coupled to the two electrodes;
      a signal amplifier coupled between the first conductor pair and configured to produce a sensor signal;
      a second, unterminated, conductor pair positioned substantially parallel to the first conductor pair; and
      a noise amplifier coupled to the second conductor pair, the noise amplifier being configured to produce a noise signal representing a noise component of the sensor signal; and
   a computer configured to obtain the noise signal from the noise amplifier and the sensor signal from the signal amplifier, wherein the computer is further configured to combine the noise signal with the sensor signal to reduce noise in the sensor signal.

9. The geophysical survey system of claim 8, wherein the computer is disposed in the survey cable.

10. The geophysical survey system of claim 8, further comprising a tow vessel, wherein the computer is located on the tow vessel.

11. The geophysical survey system of claim 8,
wherein at least part of the conductors of the first conductor pair are positioned longitudinally apart on a common axis; and
wherein at least part of the conductors of the second conductor pair are positioned longitudinally apart on a second axis parallel to the common axis.

12. The geophysical survey system of claim 8, wherein the survey cable is configured as a towable marine cable.

13. The geophysical survey system of claim 8, wherein one conductor of the first conductor pair is coupled to a first input node of the signal amplifier, and the other conductor of the first conductor pair is coupled to a second input node of the signal amplifier; and wherein the cable further includes a resistor that couples the first and second input nodes of the signal amplifier to each other.

14. The geophysical survey system of claim 8, further comprising:
a transmitting cable configured to transmit an electromagnetic (EM) signal that interacts with subterranean strata to produce variations in the sensor signal.

15. The geophysical survey system of claim 8, wherein the computer is configured to derive a relationship between the noise signal and the sensor signal as part of combining the noise signal with the sensor signal, and to use the relationship to derive a noise component of the sensor signal.

16. The geophysical survey system of claim 15, wherein the computer is further configured to subtract the noise component from the sensor signal.

17. A method for a geophysical survey system that comprises:
obtaining a sensor signal using a first, electrode terminated, conductor pair in a geophysical survey cable;
obtaining a noise signal using a second, unterminated, conductor pair substantially collocated with the first conductor pair; and
combining the noise signal with the sensor signal to provide a sensor signal having a reduced noise component.

18. The method of claim 17, wherein the combining includes deriving a relationship between the sensor signal and the noise signal; and using the relationship to estimate the noise component of the sensor signal.

19. The method of claim 17, wherein the noise signal is indicative of noise induced by changes in an electromagnetic field and by motion of the geophysical survey cable relative to the electromagnetic field.

20. The method of claim 17,
wherein the geophysical survey system comprises:
the geophysical survey cable which includes:
two electrodes spaced apart on the geophysical survey cable;
the first conductor pair coupled to the two electrodes;
a signal amplifier coupled between the first conductor pair and configured to produce the sensor signal;
the second conductor pair; and
a noise amplifier coupled to the second conductor pair and configured to produce the noise signal;
a computer configured to provide the combining of the noise signal and the sensor signal; and
a tow vessel, wherein the computer is located in the survey cable or on the tow vessel.

* * * * *